Patented June 21, 1949

2,474,198

UNITED STATES PATENT OFFICE 2,474,198

MOISTURE CONTENT-TEMPERATURE CORRELATION IN A MOVING BED CATALYST REGENERATION PROCESS

Russell Lee, Wenonah, and Frederick E. Ray, Mantua, N. J., assignors to Socony-Vacuum Oil Company, Incorporated, a corporation of New York No Drawing. Application September 16, 1944, Serial No. 554,554

3 Claims. (Cl. 252—418)

This invention has to do with the regeneration by burning of absorptive contact mass materials. Contact mass materials which may themselves be catalytic to the desired reaction or which may act as carriers or supports for the material catalytic to the desired reaction are widely used in hydrocarbon conversions, such as cracking, polymerization, reforming, and the like. Such contact masses may be either natural or artificial materials. Among the natural materials so used are the various active clays, such as fuller's earth, acid treated clays, the commercial product known as Super-Filtrol and various acid treated and activated clays. Similar materials of synthetic origin are also used and among these materials appear various forms of alumina, of silica, of mixtures of the same and of mixtures of either or of both with other metallic oxides and similar materials. These synthetic compositions may be arrived at either by precipitating gels followed by washing and calcining, or by so handling the starting mixture as to provide a gel material which may be dried to its final form. Other metallic oxides may be incorporated as by bringing about their presence as a gel in the original mixture or by impregnating a separately formed gel at some stage in its handling with a compound of the metal which may later be reduced to an oxide or other active form of the metal. These adsorptive contact mass materials may be used in the form of powders, or as particles or pellets. They may be utilized in processes wherein they are utilized as pellets or particles held in a bed-in-place. They may be used in pellet or reasonably large particle form in operations where a stream of catalyst is passed through a reactor through which a stream of gaseous reactant is also passed, under conditions such that the flow of the reactant does not appreciably affect the flow of the contact mass. That is to say, they may be utilized as moving beds or the catalyst may be showered through the reaction zone. They may also be used in the form of fine powders carried into and through the reaction zone more or less in suspension in a stream of the reactants. Practically all of these methods of utilization give rise to a collection of carbonaceous impurity, usually termed coke, upon a catalyst material. The collection of this material decreases the activity of the catalyst and the catalyst is regenerated normally by burning off the deposit. Some such adsorptive contact masses are utilized in other ways, for example, in the filtration of hydrocarbon oils to remove color bodies. Such use gives rise to a similar carbonaceous deposit which is similarly removed. This invention is concerned with the regeneration of such contact mass by burning, regardless of the manner in which the contact mass is handled in the reaction zone and regardless of the prior use of the contact mass which has resulted in the deposition of the coke to be burned off.

All such contact mass materials have been found to be susceptible to some form of damage, destructive of their activity for the purposes for which they are used, if they are exposed to elevated temperatures. The exact level at which damage to the activity of the material occurs, varies somewhat for different materials. The usual conduct of a burning operation is aimed at substantially complete removal of the deposits from the contact mass material. Effective removal of deposits, particularly from contact masses which have been used in catalytic treatment of hydrocarbons, and have been permitted to accumulate only relatively low percentage of coke, such as 3% or so by weight, requires rather high temperatures. With such materials, an effective rate of burning, particularly with coke percentages below 2% by weight, is only attained at temperatures of the order of 750–900° F., or sometimes, higher. It has been found that those contact mass materials most useful for hydrocarbon conversion, namely, the various natural and synthetic alumina, silica, alumina-silica, and similar complexes, may frequently be damaged at temperatures around 1100° to 1300° F. or so. The specific heat of the contact mass materials is such that the burning of a relatively small percentage by weight of carbon will raise the temperature from an active burning level of say 900° F. to a damaging temperature. Consequently, it has been found most useful in the regeneration of such materials to so handle the regeneration that controlled amounts of coke are burned off under closely controlled conditions, the burning being conducted in a series of stages in each of which a small increment of coke is burned.

This invention is particularly concerned with the conduct of such multi-stage regeneration operations and has to do with the proper proportioning of amount burned off and the proper control of temperature so as to secure an active regeneration temperature and accomplish a desired regeneration as expeditiously as possible with a minimum of stages and at the same time insure a proper and effective temperature control to avoid damage to the contact mass.

Among the most significant variables having to do with such an operation are the nature and percentage of coke upon the contact mass entering a burning zone, the temperature of the contact mass entering that burning zone, the amount of oxygen available for burning in that zone, the size of contact mass particles, the time the contact mass remains in the zone, and the maximum temperature which may be obtained with the particular catalyst in the zone without damage.

The amount of material which may be burned off is a rather direct function of the amount of material which is present to be burned, usually decreasing with a decreasing amount present. An idea of the relationship here may be noted by the fact that with a particular type of particle form catalyst, exposed at around 900° F. for a period of five minutes to sufficient air to accomplish the desired combustion and leave 3% of oxygen in the effluent regeneration gases, about three-tenths of 1% of carbon by weight based upon contact mass may be burned from a contact mass initially having 2.5% of residual carbon, while only about 0.07% by weight may be burned from a contact mass previously burned so that initially it has 0.5% of residual carbon. The temperature at which the burning in such a stage commences, is most desirably increased as the percentage of coke upon the contact mass at the start of the burning in such stages decreases due to partial burn off in previous stages. For example, with a particular contact mass, it is most desirable to have a temperature at the start of the burning around 800° F. for a contact mass initially having 2.5% of coke, while a temperature of around 1000° F. is desirable for that contact mass at a later stage where it has only 1% of coke at the beginning of the stage operation. It will be understood, of course, that this temperature limit is dictated by two considerations. First, it should be sufficiently high to give an active rate of combustion and second, it should be sufficiently below the temperature level at which the contact mass might be damaged, that an appreciable amount of combustion can occur before the contact mass is raised to a damaging level. While the optimum temperature of the initiation of burning in any particular stage is dependent upon the exact nature of the deposit upon the contact mass material being handled, and to some extent upon the physical form, density and the like, of the contact mass itself, and while the amount of heat liberation that may be permitted at any one burning stage is dependent upon the method of cooling, being greater for a method of handling in which some form of cooling is practised simultaneously with burning than for an operation in which the material is alternately burned without simultaneous cooling and then cooled to reduce its temperature prior to another burning, the desirable level for temperature at the initiation of burning in a multi-stage combustion regeneration operation will usually be of the order of about 800° F. and will increase from stage to stage as the coke content of the material entering each stage is less.

The rate of burning is also affected by the average amount of oxygen present in the regeneration medium. This is frequently spoken of as the partial pressure of the oxygen present and is conveniently indicated by the amount of oxygen in the regeneration gases, usually spoken of as flue gas, leaving the regeneration stage. Higher rates of burning are experienced as the amount of oxygen present exceeds that theoretically necessary for the desired burning. The actual increase in rate of burning for a given increase in excess oxygen above the theoretical varies with the amount of coke present upon the contact mass material, being greatest for contact mass material having the larger amount of coke upon it. However, in all cases, within the range of conditions and contact mass materials with which we are here concerned, the rate of increase of burning for a given set of exposure conditions decreases as the amount of excess oxygen increases, arriving in most cases at a sort of practical equilibrium with a concentration of oxygen of 5% to 8% by volume in flue gas when using fresh air as regeneration medium. Above this level increase in excess oxygen does not appreciably affect the rate of burning.

Still another variable of importance is the time during which the burning is carried out. With amounts of coke on contact mass material of the order of 1½% by weight and above, the time for which air at a given rate of volume per unit time is passed through a contact mass having a given amount of carbon on it, has a very considerable effect upon the amount of coke which may be burned off, as might be expected. With smaller amounts of coke, of the order of 1% and below, particularly on contact masses already partly burned, a doubling of the time of burning does not double the amount of material burned off. It is, of course, to be understood that in making these statements, we are speaking about burning times in the ordinary operating range of from say 3 to 10 minutes or so and are not attempting any comparison between these and either extremely short or extremely long burning times.

A most important control of the regeneration operation arises from the necessity of avoiding deterioration of the contact mass being regenerated by exposing it to unduly high temperatures which will be destructive of its activity for the purpose for which it is being used. It has heretofore been recognized that water vapor has an influence of some kind upon the efficiency of a regeneration. The action has not been entirely understood and has been attributed to a number of possible actions which might take place. Without attempting to state why water vapor may have a deleterious effect upon regeneration, we have found that a catalyst of the general class with which we are here concerned, can be heated to lesser temperatures without damage in the presence of water vapor in the flue gases above a certain limiting figure and that in the absence of water vapor, or in the presence of water vapor to an extent of less than some limiting figure, the contact mass materials may be heated to much higher temperatures without damage. For example, with one commonly used contact mass material of this kind, serious reduction of activity will occur if the material is heated to a temperature greater than about 1050° F. to 1100° F. in the presence of more than about 8-10% of water vapor in the effluent flue gas, while with a dry flue gas, free of water vapor, this same material may be heated safely to temperatures of the order of 1300° F.–1400° F. without appreciable damage. Water vapor will arise in the flue gases from two sources. The first is the water vapor present in the air used for regeneration. The second source arises from the fact that the thing called coke, that is, the carbonaceous deposit upon the contact mass, is not carbon but consists to a very large degree, particularly in the early stages of regeneration, of complex heavy hydrocarbons having an appreciable percentage of hydrogen, the combustion of which gives rise to water vapor. Normally it has been found these deposits upon a contact mass ready for regeneration have carbon and hydrogen present in a ratio near one atom of hydrogen to one atom of carbon. Consequently, in the early stages of a multi-stage combustion regeneration, the water vapor content of regeneration flue gas is quite high. For example, with bone-dry air present in sufficient quantity to give 8% residual oxygen in flue gas, it may be found that the flue gas from the first stages of a regeneration will contain as high as 15% of water vapor by volume and if the air used for combustion be humid, the water vapor present will be proportionately increased. This water vapor originating from combustion of hydrogen decreases quite rapidly with the progress of a multi-stage regeneration and it will be found that although the flue gas, even when bone-dry air is used, is never entirely free from water vapor, the water vapor content from combustion has usually practically reached a minimum by the time 40–50% of the coke has been burned from the contact mass material. In subsequent portions of the operation, after the water vapor from combustion has ceased to be generated in quantity, the water vapor from the humidity of the air used for combustion forms a proportionately much greater portion of the total water vapor in a flue gas. However, for most usual atmospheric conditions, it will be found that by the time 40%–50% and in practically all cases by the time 50% of the coke has been burned off, the water content of the flue gases is at a level which will permit increases in the maximum temperature to which the contact mass may be heated without material damage. Thus the control of maximum temperature for the particular contact mass material, of which we spoke above, would be that the temperature should not exceed 1050° F.–1100° F. until about one-half of the coke present had been burned off and thereafter the maximum temperature might be increased to around 1300° F.–1400° F. without danger of serious damage to the contact mass material.

This feature has a further significance in the proportioning of burning zones within the multi-stage operation. Due to the higher percentage of hydrogen present, the heat liberated by the combustion of a given weight of coke is much greater in the early stages of the operation. Also the maximum temperature which must be observed is lower. Consequently, the burning in earlier stages must be controlled to prevent runaway conditions damaging to the contact mass material. After the hydrogen is largely removed from the coke, a different set of conditions rules. The maximum temperature without damage is higher and the heat liberated by combustion of a unit weight of coke is less, but it is desirable to have a higher average temperature of burning in order to maintain a desirable rate of burning.

All of this can be boiled down to the statement that with the contact mass material we are using as an example, which enters the regenerator from a hydrocarbon cracking operation, at a temperature of around 750° F.–800° F., the burning in the first few stages should be conducted first so as to raise the average temperature in the burning stages to an active burning level of say about 875° F.–900° F. This indicates little or no cooling until the contact mass has arrived at a temperature of about 1050° F. as a safe maximum. Normally, one rather long stage of burning with cooling near its outlet or beyond its outlet, will be utilized at this point. Next the regenerator will be so operated as to swing between a minimum temperature of about 900° F. and a maximum temperature of about 1050° F. until about one-half of the coke which originally entered the regenerator has been burned off. This will be most readily accomplished by alternating periods of burning and cooling, or by burning stages in which heat is removed simultaneously with burning in such a fashion that while the temperature does not swing below about 900° F., it also is not permitted to swing above about 1050° F. Having burned off about half the coke and now not having water vapor present in the flue gas to an extent of more than about 5%, the maximum temperature level may be increased up to about 1300° F. and, to secure a useful rate of burning, the minimum temperature will be increased to about 1000° F. In other words, in this section, while a certain amount of cooling will be necessary, it will be less and in the final or clean-up section, it will usually be found that the burning should be conducted in the entire absence of any cooling because contact material entering the clean-up stages does not have on it sufficient carbon to heat it above a safe maximum temperature and in this stage, for efficiency, it is usually desirable to burn at temperatures near the safe maximum. Of course, in most cyclic operations in which the contact mass material is returned from the regenerator to the hydrocarbon reaction zone, cooling is necessary to reduce the temperature of the contact mass material to a temperature useful in the reaction zone. This cooling, however, is performed for a separate purpose and in reality is not a part of the regeneration operation per se.

We claim:

1. A method of regenerating an adsorptive contact mass material contaminated with a hydrogen-containing combustible carbonaceous deposit, said contact mass material being susceptible to damage at a temperature greater than about 1050°–1100° F. in the presence of a gas containing more than about 8–10 per cent of water vapor and being capable of withstanding without appreciable damage a temperature of about 1300°–1400° F. in the presence of combustion supporting gas containing not more than 5 per cent of water vapor, which comprises contacting at a temperature of about 750°–800° F. an adsorptive contact mass material contaminated with a hydrogen-containing combustible carbonaceous deposit with a combustion sustaining gas containing more than about 8–10 per cent of water vapor, raising the temperature of said contaminated contact mass to about 900°–1100° F., and maintaining said contact mass at about 900°–1100° F. whilst in contact with combustion gas containing more than about 8–10 per cent of water vapor, and thereafter when the water vapor content of the effluent flue gas is not in excess of about 5 per cent maintaining the temperature of said contact mass material within the range of about 1000°–1400° F. until said contact mass material is regenerated.

2. A method of regenerating an adsorptive contact mass material contaminated with a hydrogen-containing combustible carbonaceous deposit, said contact mass material in the presence of substantial amounts of water vapor being susceptible to damage at an elevated temperature of about 1100° F. but in the absence of a substantial amount of water vapor being capable of withstanding without substantial damage a higher temperature of about 1400° F., which comprises contacting said adsorptive contact mass material, contaminated with a hydrogen-containing combustible carbonaceous deposit at about 750°–800° F. with a combustion sustaining gas containing in excess of about 5 per cent water vapor, raising the temperature of said contaminated contact mass material to a temperature not in excess of about 1100° F., maintaining the temperature of said contaminated mass material not in excess of 1100° F. whilst in contact with said combustion supporting gas until about 40–50 per cent of said carbonaceous deposit is burned off, at which time the effluent flue gases contain not more than 5 per cent moisture, and thereafter raising the temperature of said contact mass above a temperature of about 1100° F. but not in excess of a temperature of about 1400° F. until said contact mass is regenerated.

3. A method of regenerating an adsorptive contact mass material contaminated with a hydrogen-containing combustible carbonaceous deposit, said contact mass material being susceptible to damage in the presence of more than about 8–10 per cent of water vapor at a temperature greater than about 1050°–1100° F. but capable, in the presence of a gas containing not more than about 5 per cent of water vapor, of withstanding without appreciable damage a temperature of about 1300°–1400° F., which comprises contacting at a temperature of about 750°–800° F. an adsorptive contact mass material contaminated with a hydrogen-containing combustible carbonaceous deposit with air having a water vapor content dependent upon the relative humidity, raising the temperature of said contact mass material to about 900°–1000° F. whilst passing said air in contact with said contact mass material until about 40–50 per cent of said deposit is burned off, at which time the effluent flue gases contain not more than 5 per cent moisture, and thereafter, whilst continuing to contast said mass material with said air, and raising the temperature of said contact mass material to about 1400° F. until said contact mass material is regenerated.

RUSSELL LEE.
FREDERICK E. RAY.

REFERENCES CITED

The following references are of record in the file of this patent:

UNITED STATES PATENTS

| Number | Name | Date |
| --- | --- | --- |
| 1,806,020 | Parker et al. | May 19, 1931 |
| 2,161,677 | Houdry | June 6, 1939 |
| 2,199,838 | Tyson et al. | May 7, 1940 |
| 2,215,305 | Voorhies | Sept. 17, 1940 |
| 2,273,076 | Voorhies | Feb. 17, 1942 |
| 2,320,273 | Gohr et al. | May 25, 1943 |
| 2,382,472 | Frey | Aug. 14, 1945 |